Nov. 2, 1965   R. FRITZMEIER   3,215,466
ROOF AND WINDSHIELD ASSEMBLY
Filed March 12, 1963   4 Sheets-Sheet 3
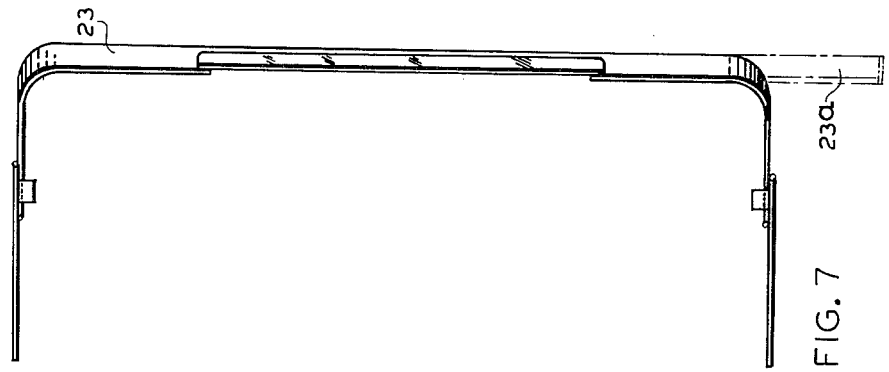
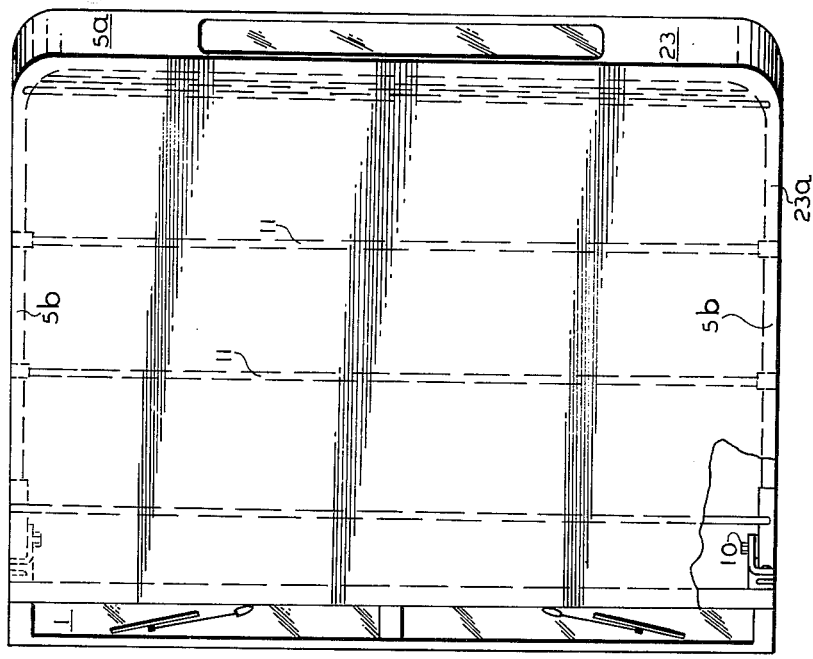
INVENTOR
RUPERT FRITZMEIER
BY
ATTORNEY

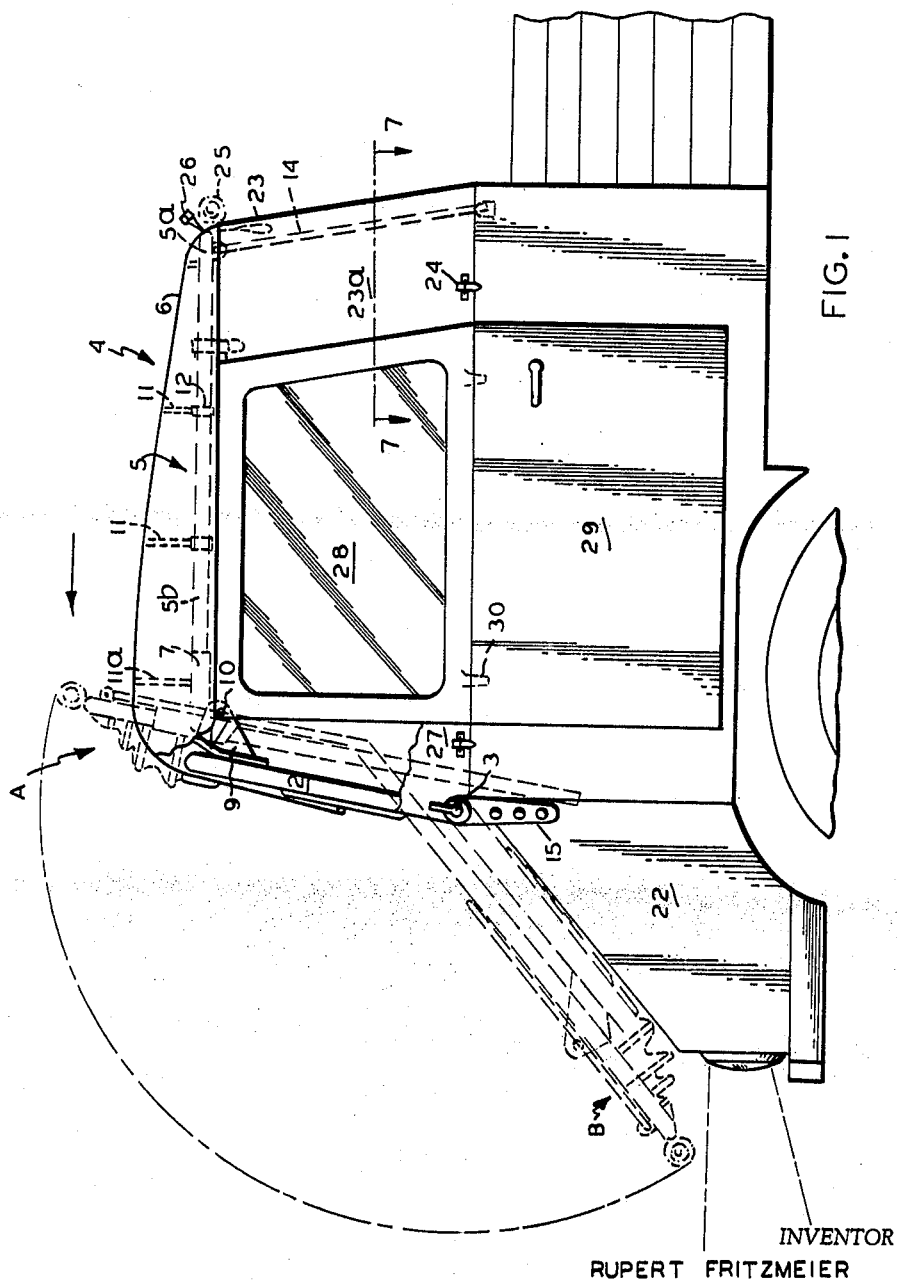

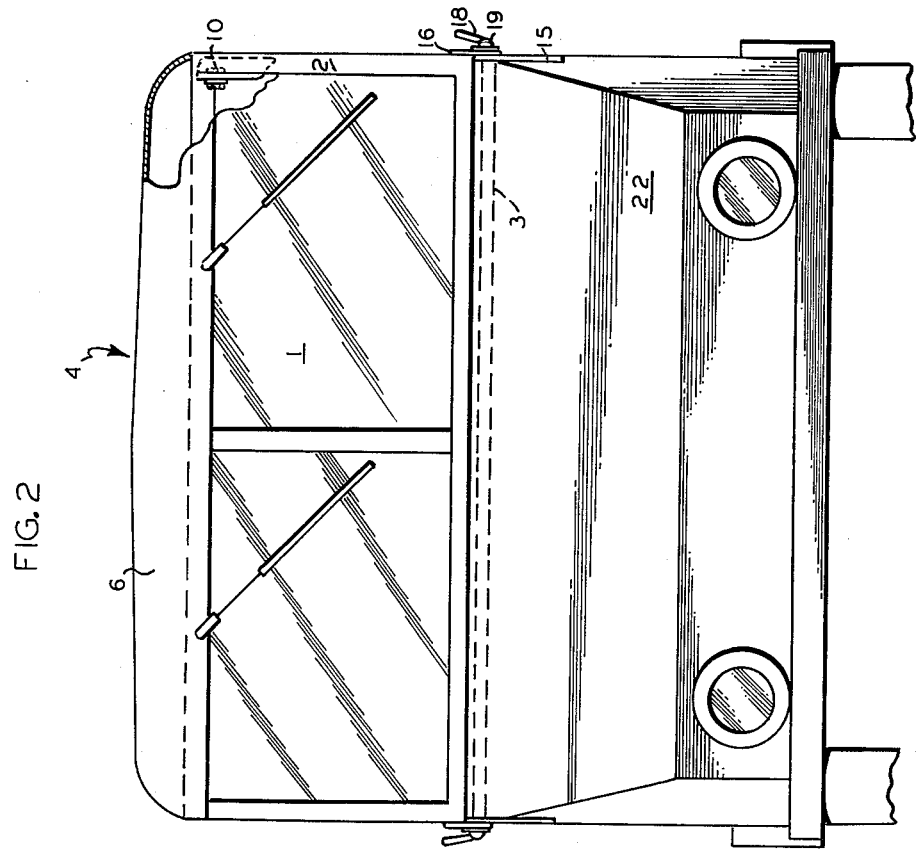
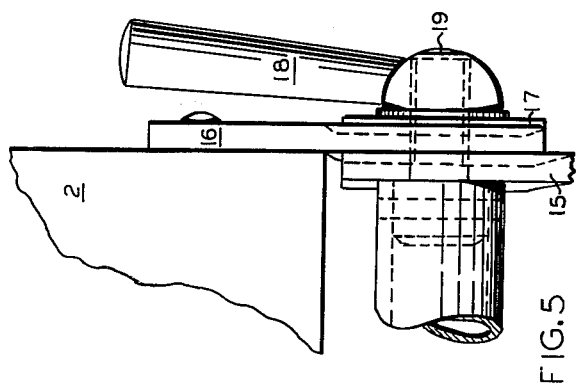
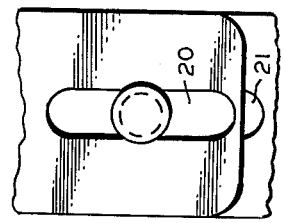

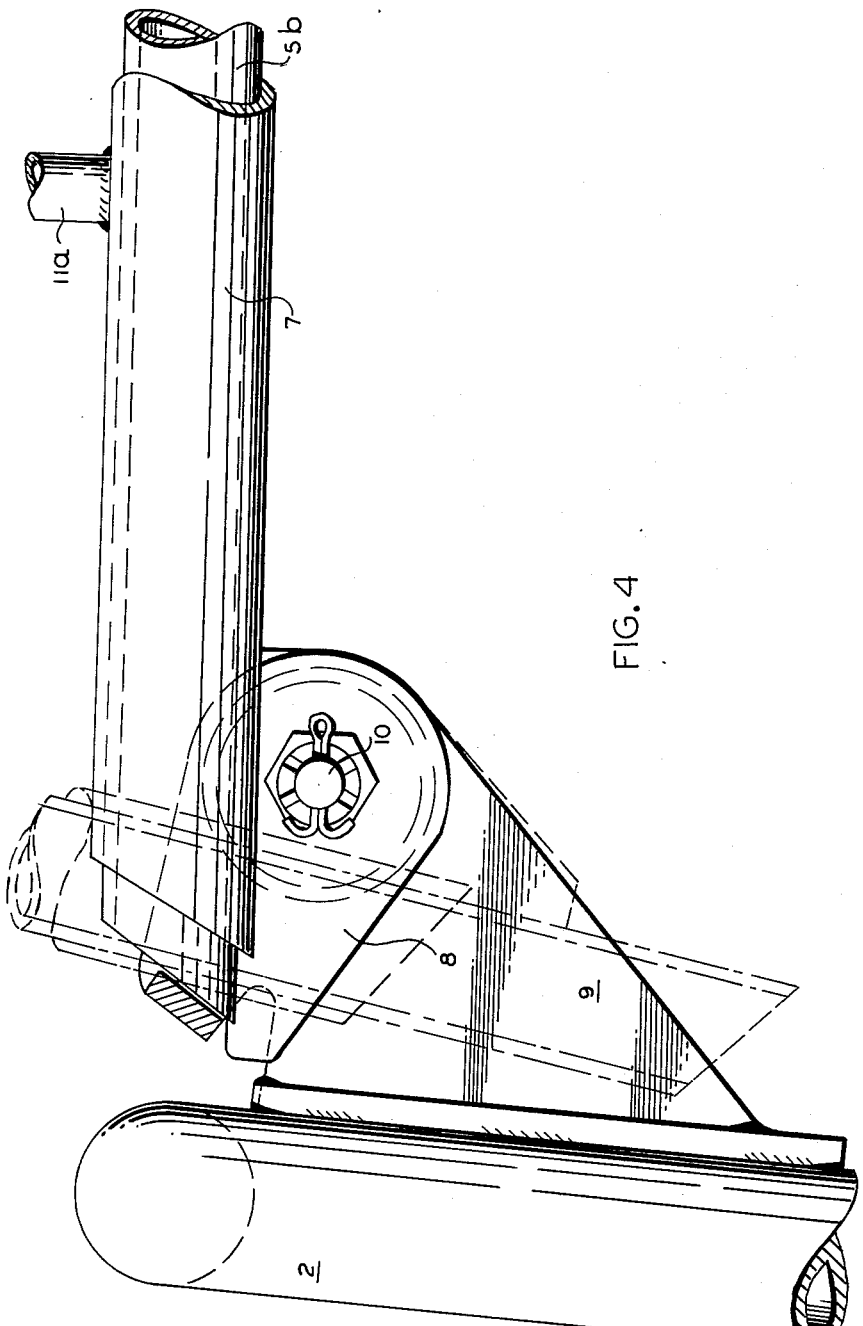

3,215,466
ROOF AND WINDSHIELD ASSEMBLY
Rupert Fritzmeier, Grosshelfendorf, near Munich, Germany, assignor to Georg Fritzmeier, a limited partnership
Filed Mar. 12, 1963, Ser. No. 264,581
Claims priority, application Germany, Mar. 14, 1962, F 36,273
3 Claims. (Cl. 296—84)

The invention relates to a vehicle hood, particularly for agricultural and forestry vehicles, the roof of which is secured to the windscreen towards which it can be folded.

Its object is to be able to make the driving seat completely free of the hood, including the windscreen, in order to improve visibility and other working conditions.

It is known to dismantle the individual parts of the hood. They then have to be parked, that is to say stored somewhere. The windscreen cannot, however, be removed.

According to the invention, these disadvantages are now to be overcome. For this purpose, a form of construction is proposed, the characteristic of which is that the windscreen is mounted on a horizontal shaft, which is arranged near its lower edge and in its direction, and about which it can be swung downwards together with the roof.

Thus constructed, the driving seat can be cleared with a few movements of the hand without the hood having to be dismantled and then stored.

When swung down into its lowest position, the windscreen should lie at least 30° to 45° below the horizontal plane running through the axis of rotation. In its lowest position, it should lie on a support, for example on the bonnet of the engine.

The roof comprises a roof frame which is bent in the shape of a U with the web of the U situated at the rear and the lateral arms of the U mounted for displacement in guiding sleeves which are connected to the frame of the windscreen by hinges in such a manner that the roof frame can be pivoted upwards until it lies substantially parallel with the plane of the windscreen and can then be displaced downwards in the guiding sleeves. In addition, the roof is provided with a flexible cover which lies on cross members which are mounted for displacement on the U-arms of the roof frame by means of eyes. This form of construction, which enables the roof to be folded together, is essentially known. In conjunction with the downward pivoting windscreen, however, it affords a particularly advantageous solution of the problem here in question.

The hood is closed like a cabin by side and rear portions which, apart from the window, are constructed, according to the invention, in such a manner that they can be rolled against the roof frame or against the frame of the windscreen and strapped thereto. Thus they, too, need not be removed.

The drawing illustrates one example of an embodiment of the invention in which:

FIGURE 1 shows the side view of the hood, partly broken away, with three different positions of the roof and/or the windscreen;

FIGURE 2 shows the associated front view, partly broken away;

FIGURE 3 shows the associated plan view, partly broken away;

FIGURE 4 shows the side view of the hinge between the roof and the windscreen, on a larger scale, in two different positions;

FIGURE 5 shows the radial view of the locking device for the windscreen, on a larger scale;

FIGURE 6 shows the associated axial view and

FIGURE 7 shows the section 7—7 of FIGURE 1.

There are indicated: the windscreen by 1, its frame by 2, its pivot by 3, the roof by 4, the roof frame by 5 and the roof cover by 6.

The roof frame 5 is U-shaped. Its U-web 5a is at the rear (FIGURE 1). Its U-arms 5b lie laterally. The front ends of the arms are mounted for displacement in a guiding sleeve 7. Each sleeve 7 comprises a tongue 8. Tongues 9 are also welded one on each side of the windscreen frame 2. The tongues 8 and 9 are articulately connected to one another by means of pins 10. They form the hinge between the roof 4 and windscreen 1.

The roof cover 6, which is flexible, for example consists of a suitable plastics material or a canvas, rests on the cross members 11 which are mounted for displacement on the U-arms 5b of the roof frame 5 by means of eyes 12 and, together with the cross members 11, can be pushed together towards the windscreen 1. The foremost cross member 11a may be rigidly connected, for example welded, to the two guiding sleeves 7. At the rear, the roof frame 5 is mounted loose or in an easily detachable manner on uprights 14 secured to the vehicle.

The whole roof 4 can, preferably after being folded together, be swung up about the hinge pin 10 until the roof frame 5 lies parallel or substantially parallel with the plane of the windscreen 1. Then the frame 5 can be displaced downwards in the guiding sleeves 7. Position A of the roof comes about in this manner (FIGURE 1).

The pivot 3 of the windscreen 1 is mounted in the supports 15 which are formed from tongues and which are secured to the chassis of the vehicle. Mounted on the frame of the windscreen 1 are arms 16 which are likewise made from tongues and which comprise a bore with which they are mounted on the pivot 3. The arms 16 are fairly short so that the windscreen 1 is close to the pivot 3.

Each support 15 also forms one jaw of the clamping device. The other jaw 17 can be tightened by means of the bar 18, which is mounted on the threaded bolt 19, which is inserted in the tubular pivot 3 and secured therein, as a result of which the arms 16 are gripped between the jaws 15 and 17 and the windscreen 1 is locked in position. One of the clamping jaws or both jaws may comprise friction discs. The locking of the windscreen 1 is more reliable in its effect if the clamping jaws 15 and the arm 16 comprise irregularities, for example ribs 20 and grooves 21 which fit into one another on their contact faces. These irregularities should actually interengage when the windscreen 1 is in the upright position of use (FIGURE 1, position in full lines).

After the release of the clamping device, the windscreen 1 together with the roof 4 can be swung downwards about the pivot 3 until it lies on the bonnet 22 of the tractor or a separate supporting device, (position B in FIGURE 1). Here the windscreen 1 lies approximately with an inclination of 45° below the horizontal line running through the pivot 3. In this position, the hood does not impair visibility either forwards or sideways and downwards.

The hood is closed like a cabin to the side and at the back.

The back wall 23, like the roof cover, consists of flexible material, for example a plastics sheet or a canvas, which is firmly connected to the web 5a of the frame 5. It comprises portions 23a which project beyond the wall 23 and which are brought towards the front and form a part of the side covering. At the bottom and the sides only pin connections 24 are provided for the cover. If these pin connections 24 are released and the side portions 23a are swung into the plane of the back wall 23, the cover can be rolled up towards the roof 4. The roll 25 thus formed (shown in broken lines in FIGURE 1) can be strapped up by means of straps 26 provided on the frame web 5a.

The side portions 27 which are likewise formed from a cover are firmly mounted on the windscreen frame 2. Their rear edge is detachably connected to the roof frame 5b and to the body of the vehicle. After these connections have been released, the side portions 27 can be rolled against the windscreen 1 and strapped thereto, likewise by means of straps.

The windows 28 are connected to the door 29 in an easily detachable manner, for example by drop-in connections 30. They can likewise be removed.

After the rolling up of the side portions 27, of the back portion 23, 23a, removal of the window 28 and pivoting of the windscreen 1 and of the roof 4 into the position B of FIGURE 1, the driver is sitting completely in the open.

I claim:

1. A roof and windshield assembly for an agricultural vehicle or similar vehicle; comprising a windshield member pivotably mounted near the lower edge thereof on support means affixed to said vehicle; hinge means rigidly affixed to said windshield member near the upper edge thereof; sleeve members roatably supported on said hinge means; a U-shaped roof frame including roof cover, the web portion of said U-shaped roof frame being positioned to the rear to said vehicle and the lateral arms of said U-shaped roof frame extending forward through said sleeve members, said U-shaped roof frame in a raised position being substantially parallel to said windshield member and capable of downward displacement through said sleeve members; and a flexible back wall rigidly mounted on said web of said U-shaped frame and detachably secured to said vehicle whereby upon release said back wall is capable of being rolled upwardly towards said roof frame and secured thereto.

2. A roof and windshield assembly for an agricultural vehicle or similar vehicle; comprising a windshield member pivotably mounted near the lower edge thereof on support means affixed to said vehicle; hinge means rigidly affixed to said windshield member near the upper edge thereof; sleeve members rotatably supported on said hinge means; a U-shaped roof frame including roof cover, the web portion of said U-shaped roof frame being positioned to the rear to said vehicle and the lateral arms of said U-shaped roof frame extending forward through said sleeve members, said U-shaped roof frame in a raised position being substantially parallel to said windshield member and capable of downward displacement through said sleeve members; and a flexible back wall rigidly mounted on said web of said U-shaped frame and detachably secured to said vehicle, said back wall including side lateral portion which forms a part of the side covering.

3. A roof and windshield assembly for an agricultural vehicle or similar vehicle; comprising a windshield member pivotably mounted near the lower edge thereof on support means affixed to said vehicle; hinge means rigidly affixed to said windshield member near the upper edge thereof; sleeve members rotatably supported on said hinge means; U-shaped roof frame, the web portion of said U-shaped roof frame being positioned to the rear of said vehicle and the lateral arms of said U-shaped roof frame extending forward through said sleeve members, said U-shaped roof frame in a raised position being substantially parallel to said windshield member and capable of downward displacement through said sleeve members; a flexible roof cover which rests on cross members slidably mounted on said lateral arms of said U-shaped roof frame; a flexible back wall having lateral side portions, said back wall being rigidly mounted on said web of said U-shaped frame and detachably secured to said vehicle and said lateral side portions being detachably secured to said frame; and flexible front side portions positioned between said windshield and the doors of said vehicle firmly mounted on either side of said windshield and detachably secured to said vehicle.

References Cited by the Examiner

UNITED STATES PATENTS

| 1,210,313 | 12/16 | Hodgson | 296—90 |
| 1,373,207 | 3/21 | Shaw | 296—102 |
| 1,376,887 | 5/21 | Johnson | 296—92 |
| 1,429,881 | 9/22 | Howe | 296—92 |
| 1,551,889 | 9/25 | Lopez | 296—109 |
| 2,423,748 | 7/47 | Acheson | 296—28 X |
| 2,486,734 | 11/49 | Campbell | 296—28 X |
| 2,567,153 | 9/51 | Jackson | 296—44 |

FOREIGN PATENTS

| 779,637 | 7/57 | Great Britain. |
| 1,265,317 | 5/61 | France. |

A. HARRY LEVY, *Primary Examiner.*